United States Patent [19]
Endo

[11] Patent Number: 4,916,687
[45] Date of Patent: Apr. 10, 1990

[54] APPARATUS FOR MOUNTING AND ROTATING AN OPTICAL CARD FOR RECORDING AND/OR REPRODUCING INFORMATION

[75] Inventor: Kiyonobu Endo, Yokohama, Japan

[73] Assignee: Canon Kabushiki Kaisha, Tokyo, Japan

[21] Appl. No.: 380,677

[22] Filed: Jul. 14, 1989

Related U.S. Application Data

[63] Continuation of Ser. No. 47,290, May 8, 1987, abandoned.

[30] Foreign Application Priority Data

May 13, 1986 [JP] Japan ............................. 61-107747
Jul. 25, 1986 [JP] Japan ............................. 61-173887

[51] Int. Cl.⁴ .......................................... G11B 17/028
[52] U.S. Cl. ................................. 369/111; 235/470; 369/258; 369/271
[58] Field of Search ............. 369/100, 111, 275, 258, 369/264, 271, 44, 45, 46; 235/470, 486, 487

[56] References Cited
U.S. PATENT DOCUMENTS 2,010,867  8/1935  Kubo ..................... 369/111
3,501,586  3/1970  Russell ................... 369/111
3,839,601  10/1974 Kimura et al. ........... 369/111

FOREIGN PATENT DOCUMENTS 56-3471   1/1981  Japan ..................... 369/282
61-16045  1/1986  Japan ..................... 369/111

Primary Examiner—Donald McElheny, Jr.
Attorney, Agent, or Firm—Fitzpatrick, Cella, Harper & Scinto

[57] ABSTRACT

This specification discloses a card-like optical information recording medium comprising a card-like base body, and concentric circular or spiral information tracks provided on the base body and capable of optically recording and/or reproducing information thereon. The specification also discloses an apparatus for recording and/or reproducing information on such card-like optical information recording medium which comprises a turn table rotatable with the card-like medium being placed thereon, a clamp mechanism for positioning and fixing the card-like medium on the turn table, and an optical head for applying a light beam to the card-like medium while moving radially of the rotation, thereby effecting recording and/or reproduction of information concentrically or spirally.

8 Claims, 4 Drawing Sheets

APPARATUS FOR MOUNTING AND ROTATING AN OPTICAL CARD FOR RECORDING AND/OR REPRODUCING INFORMATION

This application is a continuation of application Ser. No. 047,290, filed May 8, 1987, now abandoned.

BACKGROUND OF THE INVENTION

1. Field of the Invention

This invention relates to a card-like optical information recording medium and an apparatus for recording and/or reproducing information on such medium.

2. Related Background Art

Various forms such as a card-like form, a disklike form and a tape-like form are known as the forms of a recording medium used to record information thereon by the use of a light beam and reproduce the thus recorded information by the use of a light beam. Above all, an optical information recording medium formed in a card-like shape (hereinafter referred to as the "optical card") is expected to create a big demand as a recording medium which is easy to manufacture and excellent in portability and accessibility.

A popular example of such optical card is shown in FIG. 1 of the accompanying drawings.

In FIG. 1, reference numeral 41 designates a rectangular optical card base body formed of a flexible material such as a plastic sheet. The base body 41 is provided with a recording area 42 in which a plurality of parallel information tracks 43 are recorded along the longer sides of the base body 41.

FIG. 2 of the accompanying drawings is a partly cut-away perspective view showing an example of an apparatus for effecting recording of information on the optical card as described above and/or reproducing card (an information recording-reproducing apparatus for optical cards).

In FIG. 2, reference numeral 52 denotes a frame to which is fixed a first drive motor 54. A pulley 56 is mounted on the rotary shaft of the motor 54, and a pulley 58 forming a pair with the pulley 56 is rotatably mounted in the frame 52. A belt 60 is passed over these two pulleys 56 and 58 and is movable in the direction of arrow A—A. An optical card conveying carriage (shuttle) 62 is connected to the moving portion of the belt 60. The shuttle 62 can horizontally hold the optical card as shown in FIG. 1, and is formed with a window 62a in the upper portion thereof so that the recording area 42 may be exposed at that time, and is also provided with an entrance and exit 62b for the optical card at one end thereof.

A second drive motor 66 is fixed to the frame 52. Two guide rails 68 and 69 are also fixed to the frame 52 along the direction of arrow B—B, and a optical head 70 is mounted for sliding movement relative to the guide rails. The rotary shaft of the second drive motor 66 extends in the direction of arrow B—B and is screw-coupled to the optical head 70.

The optical card 64 may be inserted into the shuttle 62 in the direction of arrow A—A through the entrance and exit 62b, and this insertion is done such that the information tracks 43 on the optical card 64 coincide with the direction of arrow A—A. The second drive motor 66 is then driven to move the optical head 70 in the direction of arrow B—B to a position corresponding a desired information track 43, and then the first drive motor 54 is driven to move the belt 60 and move the shuttle 62 in the direction of arrow A—A, thereby recording information on the desired information track 43 by means of the optical head 70 or reproducing or erasing the recorded information on that information track.

The constructions and operations of the optical card and the recording-reproducing apparatus for such optical card according to the prior art have been described above, but in such optical card and apparatus, the information tracks 46 are formed as parallel straight lines as shown in FIG. 1 and therefore, during the recording, reproduction or erasing of information, it is necessary to reciprocally move the optical card 64 in the direction of the information tracks 43 relative to the optical head 70.

For this reason, during the reversal of the reciprocal movement of the optical card, a considerably great force required for deceleration, stoppage and acceleration acts and therefore, mechanical vibrations occur to the apparatus, and this has led to a problem that the proper conditions of focusing and tracking for accurately keeping the relative positional relation between the optical head 70 and the optical card 64 are disturbed and accurate recording and/or reproducing operation becomes difficult.

Also, during the reversal of the reciprocal movement, the relative speed of the optical head 70 and the optical card 64 varies remarkably and therefore, recording, reproduction and erasing of information are not effected. Accordingly, the other loss time than the time during which the recording, reproduction and erasing of information are actually effected becomes considerably great, and this has led to a problem that good working efficiency cannot be obtained.

SUMMARY OF THE INVENTION

It is an object of the present invention to solve the above-noted problems peculiar to the prior art and to provide a card-like optical information recording medium which enables information recording and/or reproducing operation to be accomplished well and efficiently and an apparatus for recording and/or reproducing information on such medium.

The above object of the present invention is achieved by the information tracks formed on the optical card being made concentric circular or spiral. Also, the apparatus for recording and/or reproducing information on such an optical card is comprised of a turn table rotatable with the optical card being placed thereon, a clamp mechanism for positioning and fixing said optical card relative to said turn table, and an optical head for applying a light beam to said optical card while moving radially of said rotation, thereby effecting recording and/or reproduction of information concentrically or spirally.

DESCRIPTION OF THE PREFERRED EMBODIMENTS

Some specific embodiments of the present invention will hereinafter be described with reference to the drawings.

Figure 3:
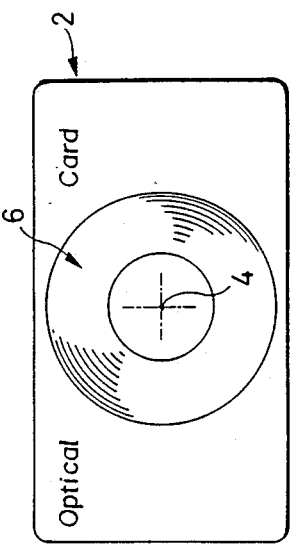
FIG. 3 is a plain view showing an embodiment of the optical card of the present invention.

FIG. 3 is a plan view showing an optical card exclusively for use for reproduction which is an embodiment of the optical card according to the present invention.

Referring to FIG. 3, reference numeral 2 designates an optical card base body which is in the form of a substantially rectangular card. The size of the base body 2 is not specifically restricted, but may be dimensions which can be contained in a pocket or a purse and are not too large or too small in portability, e.g., of the order of 85.6 mm×54.0 mm. Reference numeral 4 denotes the central position of the base body 2.

In EIG. 3, reference numeral 6 designates a recording area which is in the form of a circular ring centered at the central position 4 of the base body 2. The outer diameter of the recording area 6 is smaller than the length of the shorter side of the base body 2. A number of information tracks are formed concentrically in the recording area 6. Alternatively, the information tracks may be spiral.

Figure 4:
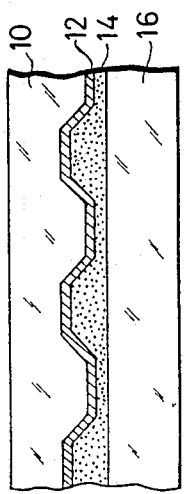
FIG. 4 is a cross-sectional view of the recording area of the optical card shown in FIG. 3.

FIG. 4 is a fragmentary longitudinal cross-sectional view of the recording area 6 of the optical card.

Referring to FIG. 4, reference numeral 10 denotes a transparent first substrate. This substrate is formed of synthetic resin such as polycarbonate, polymethyl methacrylate, polyvinyl chloride or polyethylene terephthalate, or glass. The underside of the substrate 10 is uneven, whereby information bits are constituted and information tracks are formed by the rows of the information bits. Reference numeral 12 designates a metal reflecting layer attached to the uneven surface of the substrate 10 and comprising, for example, an Al evaporated film. Reference numeral 14 denotes an adhesive layer, and reference numeral 16 designates a second substrate. The second substrate is formed of a material similar to that of the first substrate, and is joined to the metal reflecting layer 12 by the adhesive layer 14 for the purpose of protection.

The other area than the recording area 6 is similar to the recording area 6 with the exception that there is no unevenness in the first substrate 10.

The thickness of the optical card is not specifically restricted, but is, e.g. of the order of 0.76 mm.

In FIG. 4, there is shown an example in which information bits are constituted by unevenness, but of course, information bits may be constituted by the large and small magnitudes of light reflectance.

In such an optical card according to the present embodiment, if the outer diameter of the recording area 6 is 48 mm and the inner diameter of the recording area 6 is 24 mm and the size of the shortest pattern of the recording bits is 3 μm×4.5 μm and the track pitch is 6 μm and the track width is 3 μm, the amount of information which can be recorded in the recording area 6 is 6.3 MByte for the CLV system (the constant line velocity system) and 4.2 MByte for the CAV system (the constant angular velocity system), and this is a sufficient amount.

In the above-described example, the optical card has been shown as one exclusively for use for reproduction, but of course, the present invention can be likewise carried out even for the postscript type and the rewritable type. In the case of the postscript type and the rewritable type, continuous groove-like tracks are preformed concentrically or spirally on the aforementioned substrate 10 and an optical recording layer is formed on this substrate. For this recording layer, use may be made of one of various materials such as a material whose shape is varied by application of a light beam thereto, a material whose reflectance is varied by phase transition, or a so-called magnetooptical recording material whose temperature is increased by light energy, thereby direction of magnetization being varied by light energy. Information is also recorded concentrically or spirally along said grooves. Also, the information thus recorded can be optically read out with the aid of said variation in the reflectance, etc.

Figure 5:
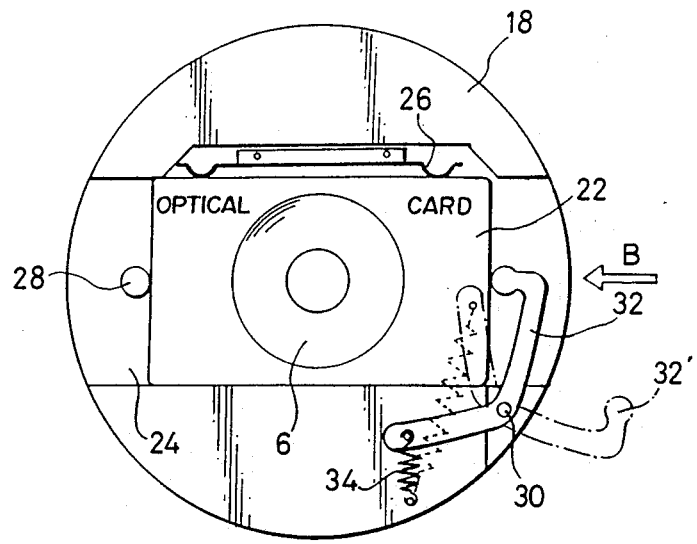
FIG. 5 is a schematic plain view showing an embodiment of the information recording-reproducing apparatus of the present invention using the optical card shown in FIG. 3.
Figure 6:
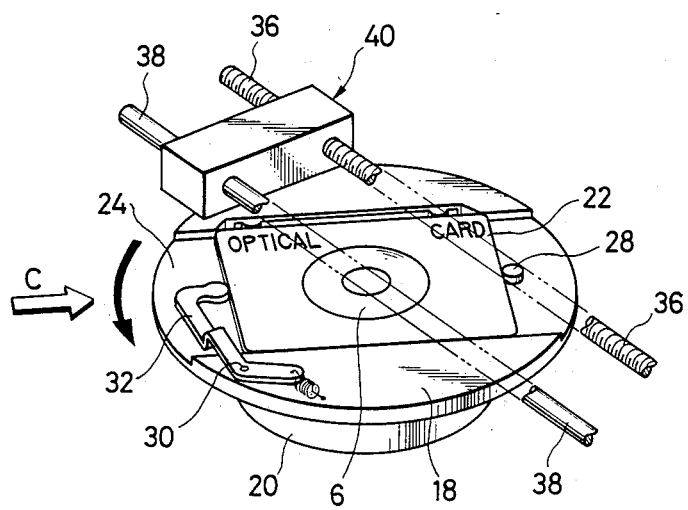
FIG. 6 is a perspective view of the essential portions of the apparatus shown in FIG. 5.

FIGS. 5 and 6 show an embodiment of the apparatus of the present invention for recording and/or reproducing information by the use of the optical card as described above, FIG. 5 being a schematic plan view of the apparatus, and FIG. 6 being a perspective view of the essential portions of the apparatus.

In these figures, reference numeral 18 designates a turn table on which the optical card may be placed and rotated, and reference numeral 20 denotes a motor for rotatively driving the turn table 18. A guide groove 24 having a width slightly greater than the length of the shorter side of the optical card 22 is formed in the upper surface of the turn table 18, and the optical card 22 is inserted until its fore end strikes against a stopper 28 while the optical card is being pressed on the groove 24 against one wall of the groove in the direction of arrow C by a plate spring 26 attached to one wall of the groove. On the turn table 18, a vertically extending pin 30 is provided at a location outside the groove 24, and the substantially central portion of a lever 32 is mounted on the pin 30 in such a manner that the lever 32 is pivotable about the pin 30. One end of a tension coil spring 34 having the other end thereof restrained on the turn table 18 is connected to one end of the lever 32. The other end of the lever 32 is restrained on that shorter side of the optical card 22 which is opposed to the shorter side of the optical card against which said stopper 28 bear against so that the optical card 22 in the groove 24 may be pressed against the stopper 28. Thus, the optical card 22 is positioned and held at a predetermined location in the groove 24 by the pressure force of the lever 32 in the direction of arrow C based on the tension of the coil spring 34 and the pressure force of the plate spring 26. In this state, the central position of the optical card 22

(i.e., the central position of the recording area 6) is disposed on the extension of the rotary drive shaft of the motor 20. Insertion and discharging of the optical card 22 may be accomplished after rotating the lever 32 about the pin 30 against the tension of the coil spring 34 and retracting the acting end of the lever 32 out of the groove 24 as indicated at 32'.

On the other hand, above the turn table 18, a feed screw 36 and a guide rail 38 are disposed parallel to the horizontal direction, and an optical head 40 is coupled to these. A female screw meshing with the feed screw 36 is fixed in the optical head 40, and the optical head 40 is slidably coupled to the guide rail 38. Thus, by the feed screw 36 being rotated by a drive motor, not shown, the optical head 40 is moved along the guide rail 38. This movement of the optical head 40 is effected along the radial direction of the recording area 6 of the optical card 22.

Accordingly, by the turn table 18 being rotated in the direction of arrow D by the drive motor 20 and the optical head 40 being moved along the guide rail 38, access to a desired information track and reproduction of the recorded information on that track can be accomplished.

Reference is now had to FIGS. 7 to 12 to describe a modification of a clamp mechanism suitable for the prevention of the slippage of the optical card during the positioning of the optical card and the rotation of the turn table in mounting the optical card on the turn table of the information recording-reproducing apparatus.

Figure 1:
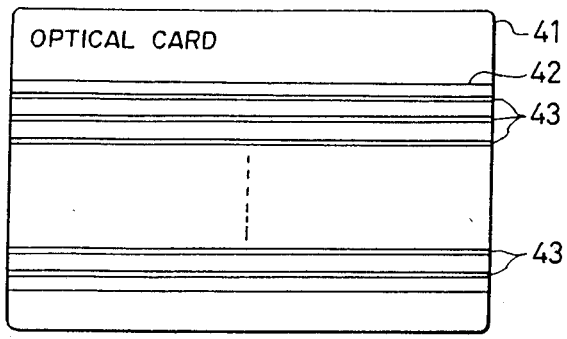
FIG. 1 is a plain view showing an example of an optical card according to the prior art.
Figure 2:
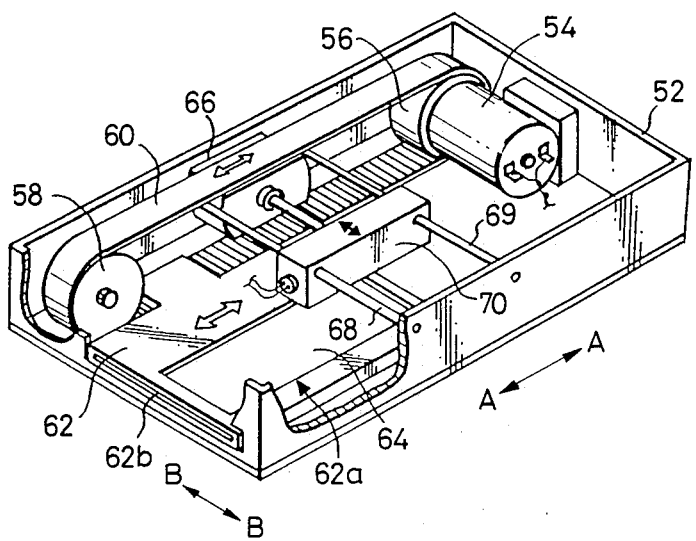
FIG. 2 is a perspective view showing an information recording-reproducing apparatus for the optical card according to the prior art.
Figure 7:
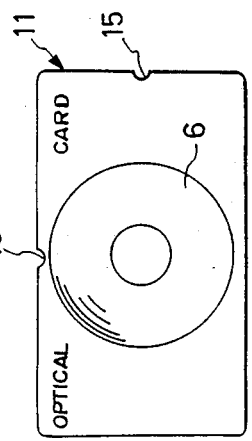
FIG. 7 is a plain view showing another embodiment of the optical card of the present invention.

The optical card 11 shown in FIG. 7 is formed with semicircular cut-aways 13 and 15 in a shorter side and a longer side, respectively, thereof.

The cut-aways 13 and 15 are shown as being formed at the centers of a shorter side and a longer side of the optical card 11, whereas this is not restrictive, but the cut-aways 13 and 15 may be formed at locations on the adjacent shorter and longer sides of the optical card 11 which are not very proximate to each other.

Figure 8:
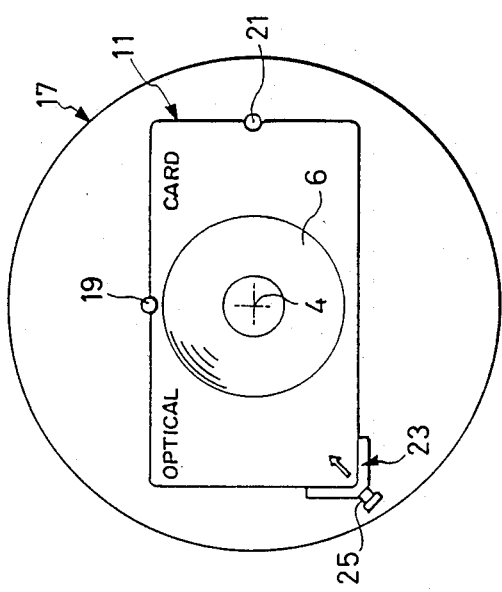
FIG. 8 is a schematic plain view showing a modification of the clamp mechanism of the information recording-reproducing apparatus of the present invention when using the optical card shown in FIG. 7.

A clamp mechanism suitable for such an optical card is shown in FIG. 8.

As shown in FIG. 8, stoppers 19 and 21 are secured on a turn table 17 to position and clamp the optical card 11 to be mounted on the turn table, and a clamp member 23 is provided at that corner of the optical card 11 which is opposed to the locations at which the stoppers are secured.

It is important that the locations at which the stoppers 19 and 21 are secured correspond to the locations at which the cut-aways 13 and 15 of the optical card 11 are formed and are such locations that the center 4 of the recording area provided on the optical card 11 corresponds to the rotary shaft of the turn table 17.

The clamp member 23 is provided with a coil spring 25, the resilient force of which acts to urge the optical card 11 against the stoppers 19 and 21 in the direction of arrow when the optical card 11 is placed on the turn table.

Thus, the optical card 11 can be accurately clamped on the turn table 17, whereby during rotation of the turn table 17, the optical card 11 can be effectively prevented from sliding from the turn table 17.

Figure 9:
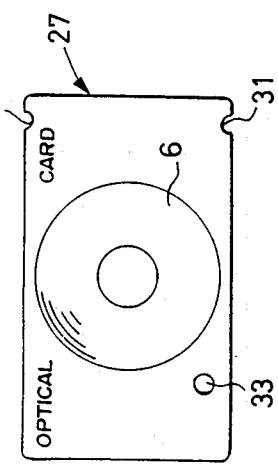
FIG. 9 is a plain view showing still another embodiment of the optical card of the present invention.

Another clamp mechanism will now be described. FIG. 9 shows an optical card formed with cut-aways different from the above-described cut-aways, and FIG. 10 shows a clamp mechanism suitable for such optical card.

In the optical card 27 shown in FIG. 9, semicircular cut-aways 29 and 31 are formed at opposed locations in the longer sides thereof, and a circular through-aperture 33 is formed at a location in the optical card 27 which is remote from the cut-aways 29 and 31 and which is outside the recording area 6.

Figure 10:
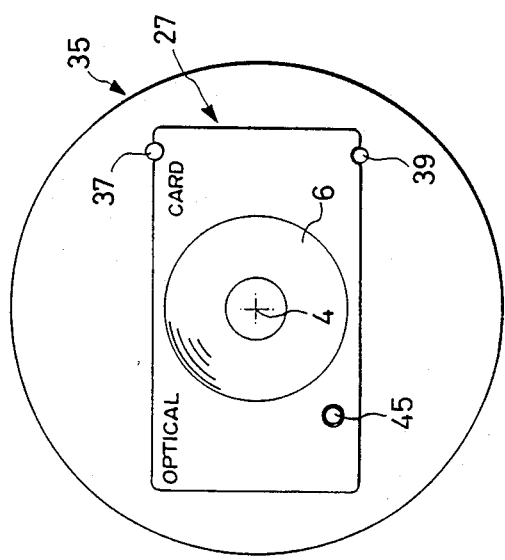
FIG. 10 is a schematic plain view showing a modification of the clamp mechanism of the information recording-reproducing apparatus when using the optical card shown in FIG. 9.

A clamp mechanism suitable for such an optical card 27 is shown in FIG. 10.

As shown in FIG. 10, stoppers 37, 39 and 45 are secured on a turn table 35 in configurational and positional relationships corresponding to the cut-aways 29, 31 and through-aperture 33 formed in the optical card 27 and moreover so that the center 4 of the recording area provided in the optical card 27 coincides with the rotary shaft of the turn table 35.

In the clamp mechanism constructed as described above, when the optical card 27 has been mounted in place on the turn table 35, the stoppers 37, 39 and 45 together form a triangular shape and are engaged with the cut-aways 29, 31 and through-aperture 33 in the optical card 27 and therefore, even during rotation of the turn table 35, the optical card 35 can be effectively prevented from sliding from the turn table 35.

In the above-described two clamp mechanisms, the various means provided to restrain the optical card together form a triangular shape and position the optical mounted on the turn table and moreover, act to prevent the optical card from sliding from the turn table during rotation of the turn table, and such action can also be provided by two restraining means having any spacing therebetween as in a clamp mechanism which will be described below.

Figure 11:
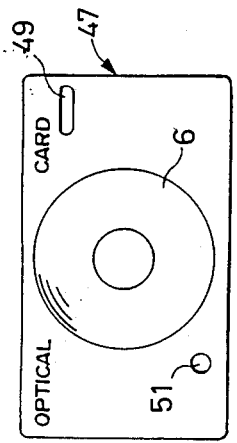
FIG. 11 is a plain view showing yet still another embodiment of the optical card of the present invention.
Figure 12:
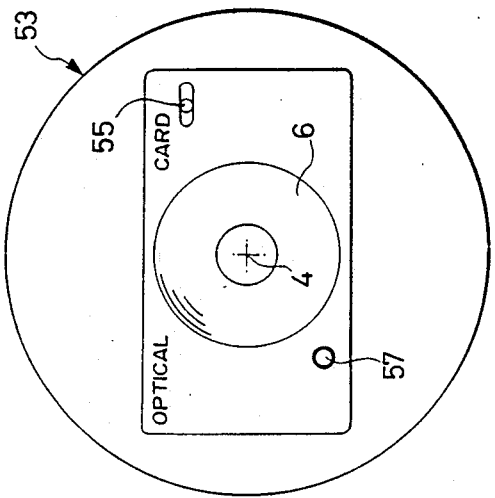
FIG. 12 is a schematic plain view showing a modification of the clamp mechanism of the information recording-reproducing apparatus of the present invention when using the optical card shown in FIG. 11.

That is, as still another embodiment, an optical card and a clamp mechanism therefor are shown in FIGS. 11 and 12, respectively.

The optical card 47 shown in FIG. 11 is formed with a slot 49 in a corner thereof which is outside the recording area 6 of the optical card, and is further formed with a through-aperture 51 in a corner diagonally corresponding to said corner.

In a clamp mechanism suitable for such an optical card 47, as shown in FIG. 12, stoppers 55 and 57 are secured on a turn table 53 in configurational and positional relationships corresponding to the slot 49 and through-aperture 51 formed in the optical card 47 and moreover so that the center 4 of the recording area provided in the optical card 47 coincides with the rotary shaft of the turn table 53. However, the stopper 55 need not be of an elliptical cross-sectional shape corresponding to the slot 49.

By such a clamp mechanism, the optical card 47 can be accurately positioned on the turn table 53 and moreover, during rotation of the turn table, the optical card 47 can be effectively prevented from sliding from the turn table 53.

The present invention is not restricted to the above-described embodiments, but various modifications thereof are possible. The present invention covers all such modifications without departing from the scope of the invention as defined in the appended claims.

I claim:

1. An apparatus for recording and/or reproducing information on a card-like information recording medium, comprising:

a turntable rotatable with the card-like medium placed thereon;

A clamp mechanism for clamping the card-like medium on said turntable, said clamp mechanism comprising a guide wall adapted to abut a side of the card-like medium and biasing means for biasing the card-like medium against the guide wall; and head means for effecting recording and/or reproducing of information concentrically or spirally on the card-like medium while moving radially of its rotation.

2. An apparatus according to claim 1, wherein said biasing means comprises a spring to press a side of the card-like medium opposed to the side of the card-like medium abutting said guide wall.

3. An apparatus according to claim 1, wherein said clamp mechanism further comprises means for restricting movement of the card-like medium in a direction along said guide wall.

4. An apparatus according to claim 3, wherein said restricting means comprises a stopper adapted to abut a side of the card-like medium perpendicular to the side of the card-like medium abutting said guide wall and second biasing means for pressing the card-like medium against the stopper.

5. An apparatus according to claim 4, wherein said second biasing means comprises a pin, a lever having a tip end and being pivotable about said pin, and a spring for biasing said lever so that the tip end of said lever presses said card-like medium.

6. An apparatus for recording and/or reproducing information on a card-like information recording medium which is formed with at least two stopper receivers, each stopper receiver being one of a cut-away and a through aperture, in respective locations thereon, comprising:

a turntable rotatable with the card-like medium placed thereon;

a clamp mechanism for clamping the card-like medium on said turntable, said clamp mechanism comprising stoppers engaged with said stopper receivers of the card-like medium to prevent the card-like medium from moving relative to said turntable, said stoppers being arranged in at least two positions each apart from the center of rotation of said turntable; and head means for effecting recording and/or reproducing of information concentrically or spirally on the card-like medium while moving radially of its rotation.

7. An apparatus according to claim 6, wherein the stopper receivers include two cut-aways formed in respective sides perpendicular to each other on the card-like medium, and wherein said clamp means comprises two stoppers engaged with the two cut-aways, respectively, and biasing means for pressing a corner of said card-like medium, formed by the intersection of sides of said card-like medium in which said cut-aways are not formed, against said stoppers.

8. An apparatus according to claim 6, wherein said clamp mechanism comprises three stoppers engaged with three stopper receivers which are formed in the card-like medium so that each forms a vertex of a triangle.

* * * * *